US008739066B1

(12) United States Patent
Agarwal et al.

(10) Patent No.: US 8,739,066 B1
(45) Date of Patent: *May 27, 2014

(54) SYSTEMS AND METHODS FOR INFERRING CONCEPTS FOR ASSOCIATION WITH CONTENT

(75) Inventors: Sumit Agarwal, San Carlos, CA (US); Brian Axe, San Francisco, CA (US); Alex Carobus, Mountain View, CA (US); Shuman Ghosemajumder, Mountain View, CA (US); Gokul Rajaram, Mountain View, CA (US); Rama Ranganath, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1029 days.

This patent is subject to a terminal disclaimer.

(21) Appl. No.: 12/684,668

(22) Filed: Jan. 8, 2010

Related U.S. Application Data

(63) Continuation of application No. 10/879,521, filed on Jun. 30, 2004, now Pat. No. 7,673,253.

(51) Int. Cl.
G06F 3/00 (2006.01)
G06F 3/048 (2013.01)

(52) U.S. Cl.
USPC ............................ 715/811; 715/745; 715/789

(58) Field of Classification Search
USPC .................. 715/711, 714, 745, 760, 764, 811
See application file for complete search history.

(56) References Cited

U.S. PATENT DOCUMENTS

| 5,748,954 | A | * | 5/1998 | Mauldin | .................... 707/999.1 |
| 5,754,939 | A | | 5/1998 | Herz et al. | |
| 6,112,202 | A | * | 8/2000 | Kleinberg | .............. 707/999.005 |
| 6,141,010 | A | | 10/2000 | Hoyle | |
| 6,285,999 | B1 | * | 9/2001 | Page | .............................. 715/230 |
| 7,031,968 | B2 | | 4/2006 | Kremer et al. | |
| 2002/0040395 | A1 | * | 4/2002 | Davis et al. | .................... 709/224 |
| 2005/0086260 | A1 | * | 4/2005 | Canright et al. | ........... 707/104.1 |
| 2005/0149880 | A1 | | 7/2005 | Postrel | |

OTHER PUBLICATIONS

Sumit Agarwal et al., Co-pending U.S. Appl. No. 10/879,521, filed Jun. 30, 2004, entitled "Systems and Methods for Inferring Concepts for Association with Content".

* cited by examiner

Primary Examiner — Weilun Lo
Assistant Examiner — Truc Chuong
(74) Attorney, Agent, or Firm — Harrity & Harrity, LLP

(57) ABSTRACT

A system indirectly infers concepts associated with a document. The concepts may be indirectly inferred based on information that does not include characteristics of the document, such as the characteristics that include a textual content of the document not associated with links included in the document, a domain of the document, and the document's Uniform Resource Locator (URL). The system may label the inferred concepts as useful to an audience of the document.

20 Claims, 14 Drawing Sheets

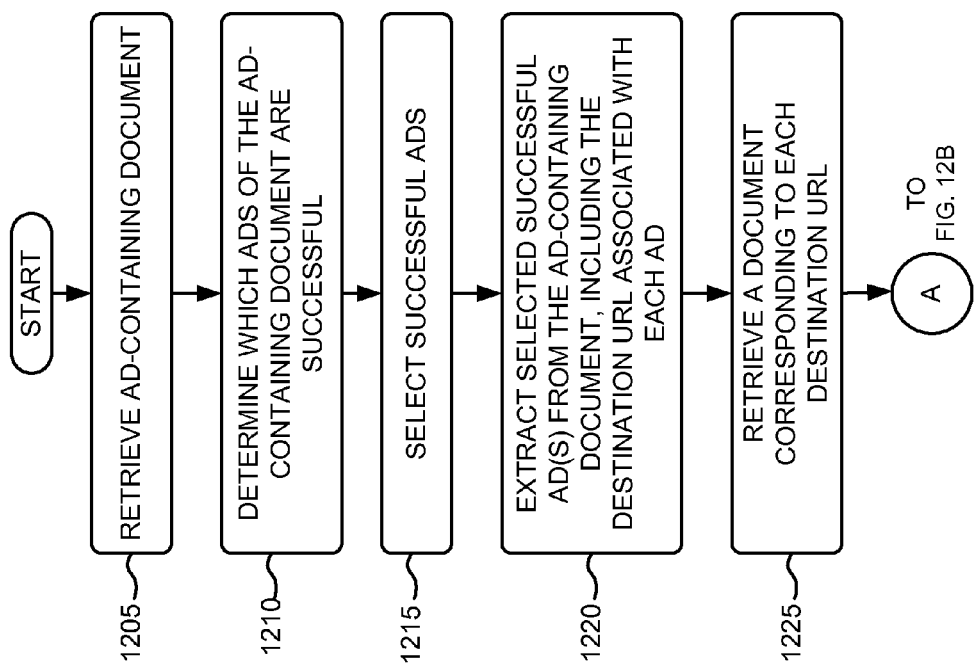

SYSTEMS AND METHODS FOR INFERRING CONCEPTS FOR ASSOCIATION WITH CONTENT

RELATED APPLICATION

This application is a continuation of U.S. application Ser. No. 10/879,521, filed Jun. 30, 2004, the entire contents of which is incorporated herein by reference.

BACKGROUND

1. Field of the Invention

Systems and methods consistent with the principles of the invention relate generally to concept remapping and, more particularly, to indirectly inferring new or related concepts for association with a given piece of content.

2. Description of Related Art

Existing servers that host documents, such as, for example, web pages, associate concepts with each document so that other content, such as advertisements, that may be useful or relevant to an audience of the document, can be matched with those concepts and then inserted in the document. Currently, the concepts associated with a given document, such as, for example, a web page, are inferred solely from three document characteristics: 1) the textual content of the document; 2) the domain of the document; and 3) the Uniform Resource Locator (URL) of the document. For example, a web page may include content related to "surfing" and, thus, the concept "surfing" can be directly inferred from the textual content of the page. Other content may then be inserted into the page based on the other content's relationship with the concept "surfing." For example, a surfboard advertisement may be inserted into the page that has the concept "surfing" associated with it. Existing concept inference techniques, however, do not permit the inference of other concepts that are not directly inferable from these three characteristics of the document.

SUMMARY OF THE INVENTION

According to one aspect consistent with the principles of the invention, a method of inferring concepts associated with a document is provided. The method may include retrieving the document, and indirectly inferring concepts associated with the document based on information that does not comprise characteristics of the document. The method may also include labeling the inferred concepts as useful to an audience of the document.

According to another aspect, a method of determining concepts useful to an audience of a first document is provided. The method may include extracting a uniform resource locator (URL) associated with an advertisement contained in the first document and retrieving a second document corresponding to the URL. The method may further include extracting concepts from the second document and labeling the extracted concepts as useful to an audience of the first document.

According to a further aspect, a method of determining concepts useful to an audience of a first document is provided. The method may include identifying at least one link in a first document pointing from the first document to other documents and extracting first concepts associated with the other documents. The method may further include labeling the extracted first concepts as useful to an audience of the first document.

According to yet another aspect, a method of determining concepts useful to an audience of a given document is provided. The method may include tracking user retrieval of multiple documents, where the multiple documents include the given document. The method may further include identifying documents that the user retrieves before or after retrieval of the given document and extracting concepts from each of the identified documents. The method may also include labeling the extracted concepts as useful to an audience of the given document.

According to a further aspect, a method of determining concepts useful to an audience of an advertisement containing document is provided. The method may include retrieving the advertisement containing document and extracting first concepts associated with at least one advertisement contained in the document. The method may also include determining advertisement campaigns that contain the extracted first concepts and extracting other concepts from the determined advertisement campaigns. The method may further include labeling the extracted other concepts as useful to an audience of the advertisement containing document.

According to another aspect, a method of determining concepts useful to an audience of a first document is provided. The method may include determining which advertisements contained in the first document are successful and extracting a uniform resource locator (URL) associated with each of the determined successful advertisements. The method may further include retrieving second documents corresponding to each of the URLs and extracting concepts from each of the second documents. The method may also include labeling the extracted concepts as useful to an audience of the first document.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 5, 7, 9-11, 12A and 12B are flowcharts of exemplary processes for inferring concepts useful to an audience of a document, corresponding to act 405 of FIG. 4, consistent with the principles of the invention.

DETAILED DESCRIPTION

The following detailed description of the invention refers to the accompanying drawings. The same reference numbers in different drawings may identify the same or similar elements. Also, the following detailed description does not limit the invention.

A "document," as the term is used herein, is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link" as the term is used here, is to be broadly interpreted to include any reference to or from a document.

Exemplary Overview

Figure 1:
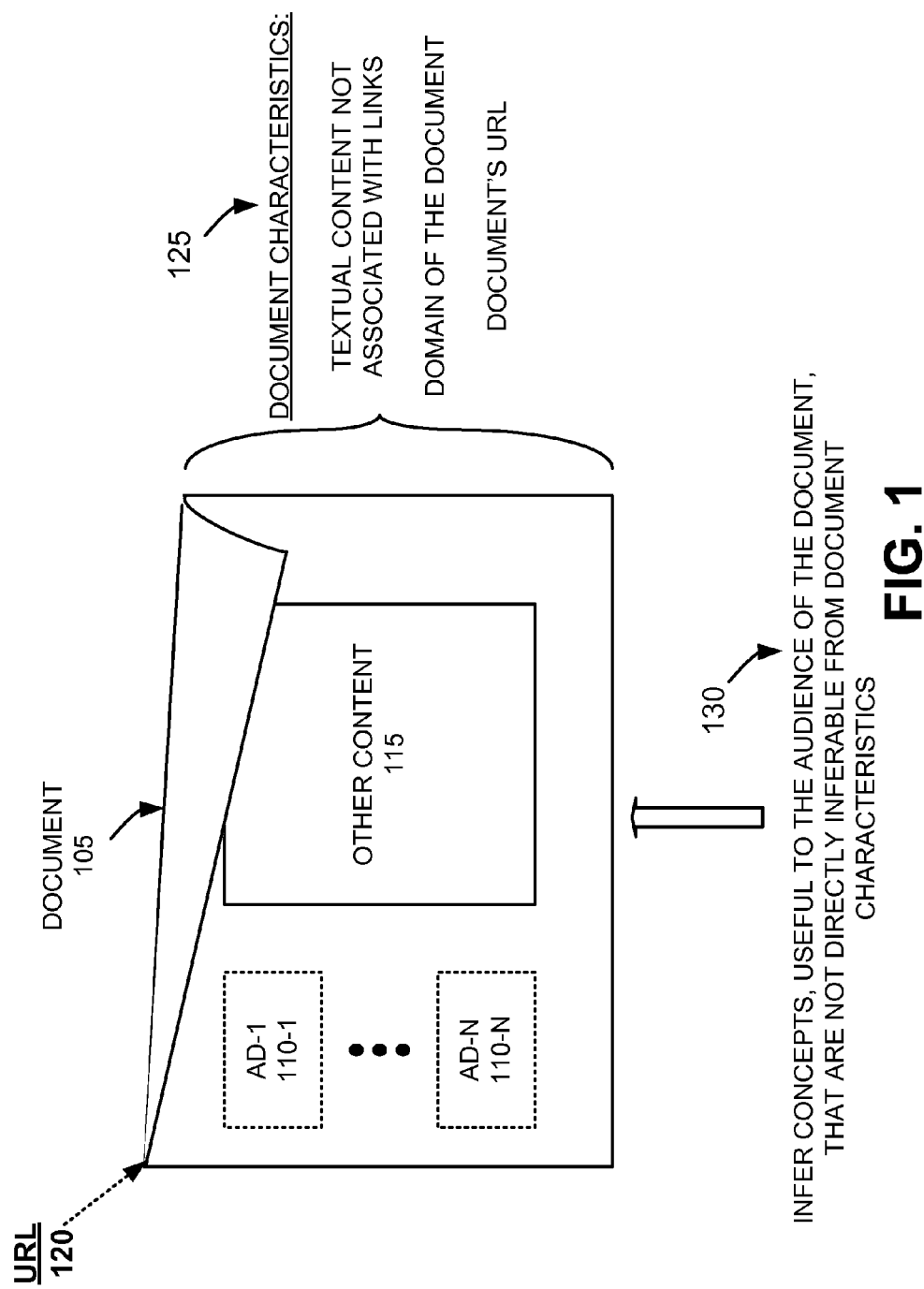
FIG. 1 is a diagram of an overview of an exemplary aspect of the invention.

FIG. 1 illustrates an overview of indirectly inferring new or related concepts for a document consistent with the principles of the invention. As shown in FIG. 1, a document 105 may include, optionally, multiple advertisements 110-1 through 110-N, and other content 115. Each advertisement 110 may include data related to advertising a product or service. Each advertisement 110 may also have associated with it a Uniform Resource Locator (URL) that points to the location of another document that contains additional advertising related data. Other content 115 may include any type of data content, including text, image, or graphic data content. A uniform resource locator (URL) 120 may identify a location of document 105 within a network.

Document 105 may include one or more document characteristics 125 that can be used to directly infer concepts for document 105. Document characteristics 125 may include document 105's URL 120, a domain of document 105, and textual content contained in document 105 that is not associated with links embedded in document 105.

Consistent with principles of the invention, concepts 130 may be inferred that are useful to an audience of document 105 and which are not directly inferable from document characteristics 125. In one implementation, such indirect concept inference processes may include retrieving documents corresponding to URLs associated with ads 110-1 through 110-N, extracting concepts from the retrieved documents, and labeling the extracted concepts as useful to an audience of document 105. In another implementation, links in document 105 pointing to other documents, and link documents that include links pointing to document 105 are identified. Concepts associated with the other documents and the link documents may then be extracted and labeled as useful to an audience of document 105. In a further implementation, search queries used to search through a corpus of documents, and return document 105 as a search result, may be used, partially or in their entirety, as concepts to be associated with document 105. These concepts may be labeled as useful to an audience of document 105. In yet a further implementation, the documents retrieved by a user may be tracked and, in particular, the documents retrieved by the user before or after retrieval of document 105 are identified. Concepts may be extracted from each of the identified documents and labeled as useful to an audience of document 105. Several exemplary processes for indirectly inferring concepts for document 105 are described below with respect to FIGS. 5, 7, 9-11, 12A and 12B.

Exemplary Network Configuration

Figure 2:
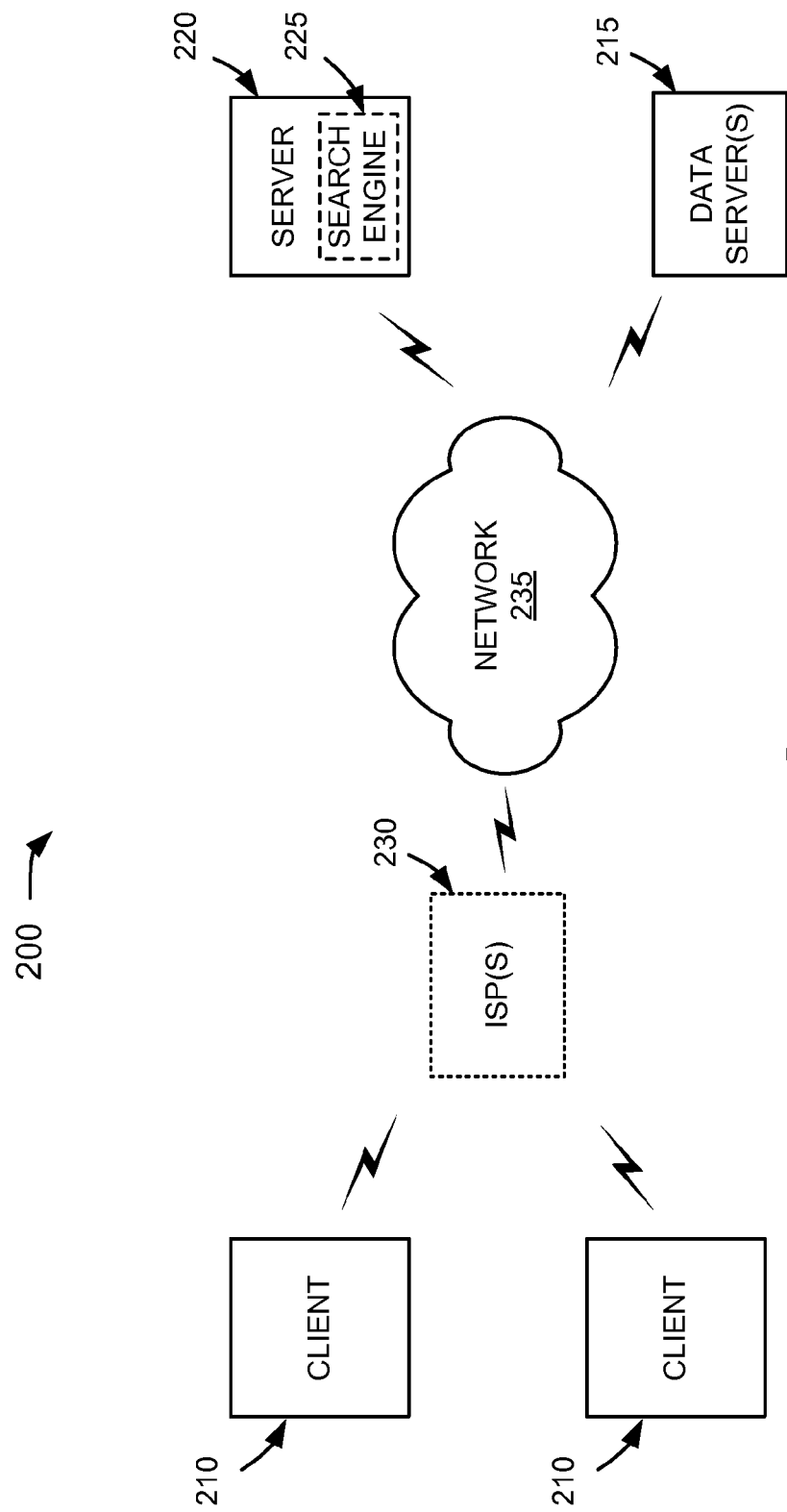
FIG. 2 is a diagram of an exemplary network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220 and 215 via a network 235 and, optionally, via one or more Internet Service Providers (ISPs) 230. Network 235 may include a local area network (LAN), a wide area network (WAN), a telephone network, such as the Public Switched Telephone Network (PSTN), an intranet, the Internet, a memory device, another type of network, or a combination of networks. Two clients 210 and two servers 220 and 215 have been illustrated as connected to network 235 for simplicity. In practice, there may be more or fewer clients and servers. Also, in some instances, a client may perform the functions of a server and a server may perform the functions of a client.

Clients 210 may include client entities. An entity may be defined as a device, such as a wireless telephone, a personal computer, a personal digital assistant (PDA), a laptop, or another type of computation or communication device, a thread or process running on one of these devices, and/or an object executable by one of these devices. Servers 220 and 215 may include server entities that gather, process, search, and/or maintain documents in a manner consistent with the principles of the invention. Clients 210 and servers 220 and 215 may connect to network 235 via wired, wireless, and/or optical connections. ISP(s) 215 may connect clients 210, and servers 215 and 220 (connections not shown), to network 235 and may include a gateway and/or server.

In an implementation consistent with the principles of the invention, server 220 may include a search engine 225 usable by users at clients 210. Server 220 may implement a data aggregation service by crawling a corpus of documents (e.g., web pages) hosted on data server(s) 215 and store information associated with these documents in a repository of crawled documents. The data aggregation service may be implemented in other ways, such as by agreement with the operator(s) of data server(s) 215 to distribute their hosted documents via the data aggregation service. Search engine 225 may execute a search, received from a user, on the corpus of documents hosted on data server(s) 215 and return the results of the search to the user via network 235.

Server(s) 215 may store or maintain documents that may be crawled by server 220. Such documents may include data related to published news stories, products, images, user groups, geographic areas, or any other type of data. For example, server(s) 215 may store or maintain news stories from any type of news source, such as, for example, the Washington Post, the New York Times, Time magazine, or Newsweek. As another example, server(s) 215 may store or maintain data related to specific product data, such as product data provided by one or more product manufacturers. As yet another example, server(s) 215 may store or maintain data related to other types of web documents, such as pages of web sites.

While servers 220 and 215 are shown as separate entities, one or more of servers 220 and 215 may perform one or more of the functions of another one or more of servers 220 and 215. For example, two or more of servers 220 and 215 may be implemented as a single server. Also, a single one of servers 220 or 215 may be implemented as two or more separate (and possibly distributed) devices.

Exemplary Client/Server Architecture

Figure 3:
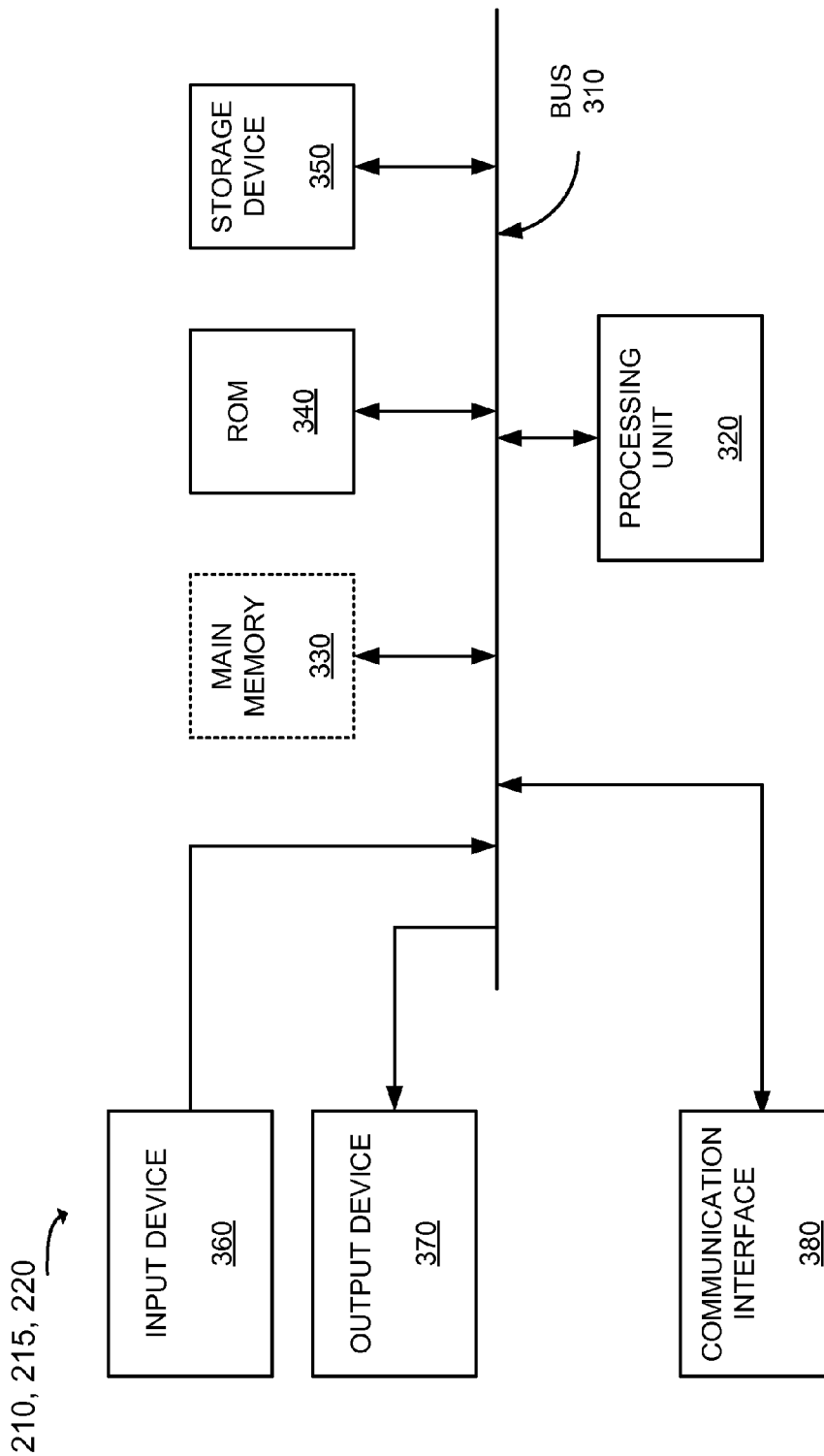
FIG. 3 is an exemplary diagram of a client, server and/or Internet Service Provider of FIG. 2 in an implementation consistent with the principles of the invention.

FIG. 3 is an exemplary diagram of a client or server entity (hereinafter called "client/server entity"), which may correspond to one or more of clients 210, servers 220 and 215, and ISP(s) 230, according to an implementation consistent with the principles of the invention. The client/server entity may include a bus 310, a processing unit 320, an optional main memory 330, a read only memory (ROM) 340, a storage device 350, an input device 360, an output device 370, and a communication interface 380. Bus 310 may include a path that permits communication among the components of the client/server entity.

Processing unit 320 may include any type of software, firmware or hardware implemented processing device, such as, a microprocessor, a field programmable gate array (FPGA), combinational logic, etc. Main memory 330 may include a random access memory (RAM) or another type of dynamic storage device that stores information and instructions for execution by processing unit 320, if processing unit 320 includes a microprocessor. ROM 340 may include a conventional ROM device or another type of static storage device that stores static information and/or instructions for use by processing unit 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 235.

As will be described in detail below, the client/server entity, consistent with the principles of the invention, may perform certain concept inference related operations. The client/server entity may, in some implementations, perform these operations in response to processing unit 320 executing software instructions contained in a computer-readable medium, such as memory 330. A computer-readable medium may be defined as one or more physical or logical memory devices and/or carrier waves.

The software instructions may be read into memory 330 from another computer-readable medium, such as data storage device 350, or from another device via communication interface 380. The software instructions contained in memory 330 may cause processing unit 320 to perform processes that will be described later. Alternatively, hardwired circuitry may be used in place of, or in combination with, software instructions to implement processes consistent with the principles of the invention. Thus, implementations consistent with principles of the invention are not limited to any specific combination of hardware circuitry and software.

Exemplary Indirect Concept Inference Process

Figure 4:
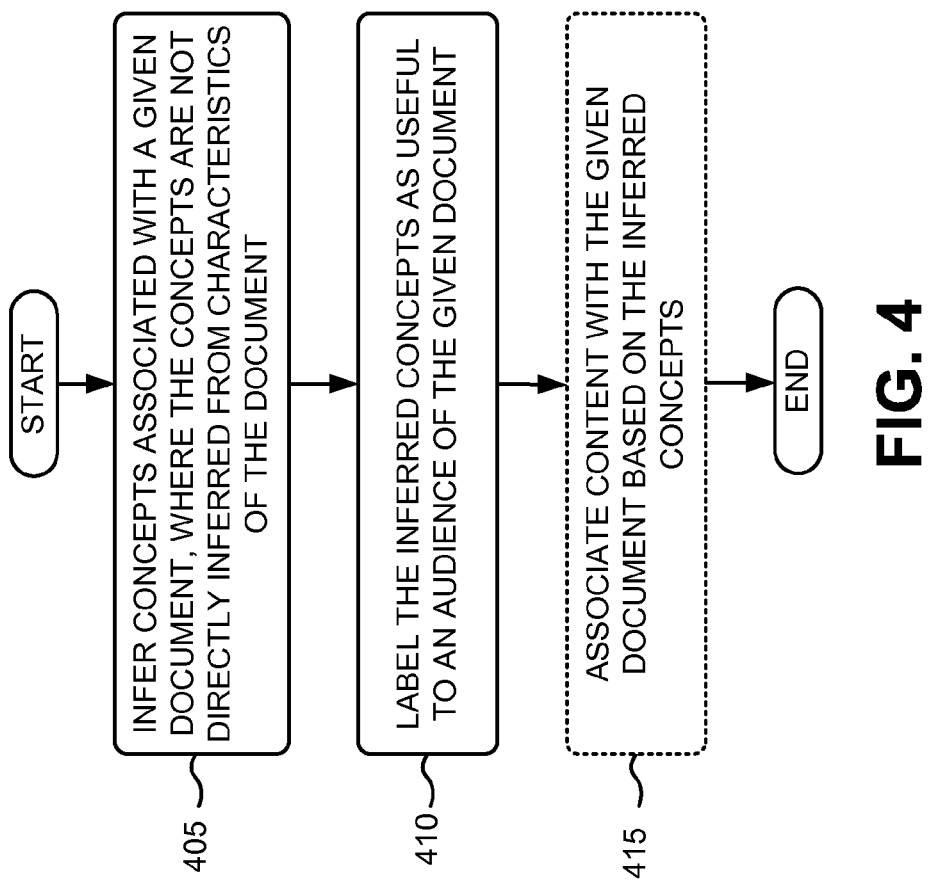
FIG. 4 is a flowchart of an exemplary process for indirectly inferring new or related concepts for a document consistent with the principles of the invention.

FIG. 4 is a flowchart of an exemplary process for indirectly inferring new or related concepts for a document consistent with the principles of the invention. Various different techniques may be employed, consistent with the invention, for indirectly inferring concepts for a document (i.e., act 405 below), as further detailed below with respect to FIGS. 5, 7 and 9-11.

The exemplary process may begin with inferring concepts associated with a given document (e.g., document 105), where the concepts are not directly inferred from characteristics of the document (act 405). The characteristics of the document may include: 1) textual content of the document not associated with links contained in the document; 2) a domain of the document; and 3) the document's Uniform Resource Locator (URL). Consistent with the invention, the concepts associated with the given document are not directly inferred from any of the characteristics set forth above. FIGS. 5, 7 and 9-11 below each describe a different concept inference process that may be employed in act 405 of the process of FIG. 4.

The inferred concepts may then be labeled as useful to an audience of the given document (act 410). Optionally, content may be associated with the given document based on the inferred concepts (act 415). Content, such as, for example, advertisements, may be associated with the given document based on the inferred concepts. For example, perfume ads may be included in a document, which has content of interest to women, but that does not include content related to fragrances or perfumes. As another example, advertisements related to bus transportation may be included in a document, which has content of interest to students, but that does not contain content related to travel.

Exemplary Process

Figure 5:
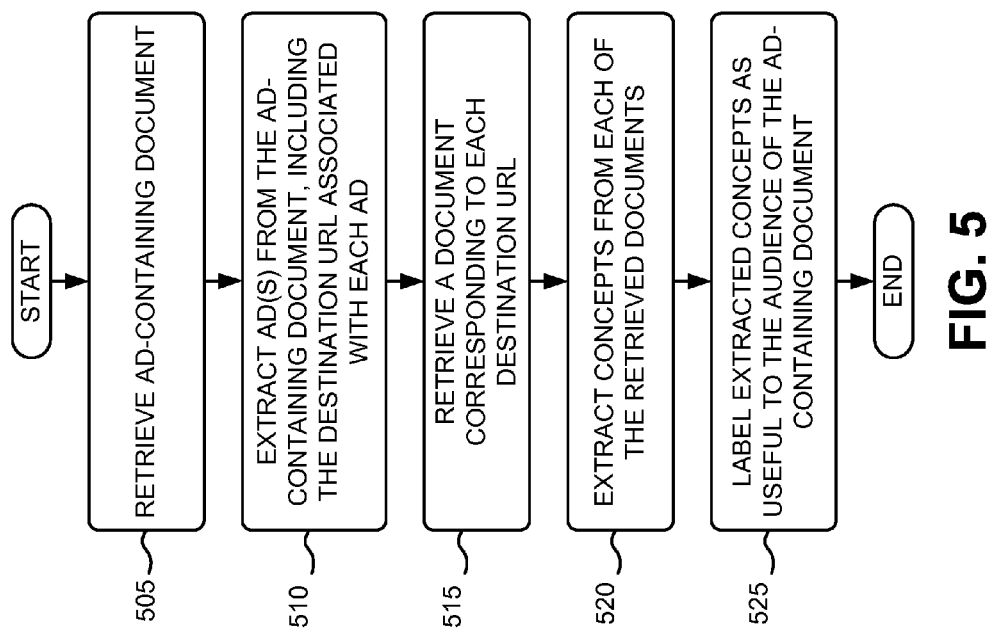

FIG. 5 is a flowchart of one exemplary process for inferring new or related concepts for a document containing one or more advertisements consistent with the principles of the invention. FIG. 5 provides further details of one exemplary process for implementing act 405 of FIG. 4.

Figure 6:
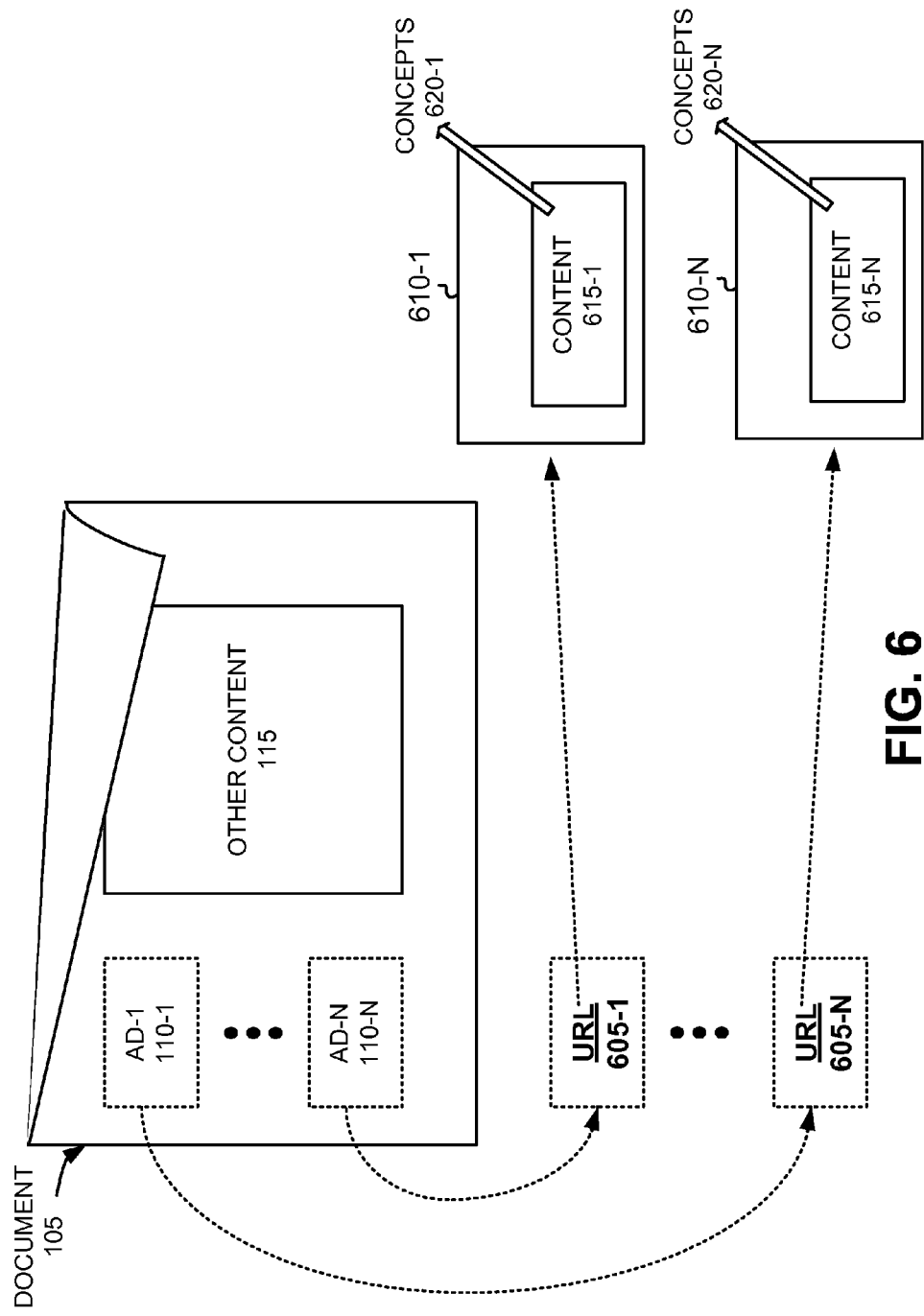
FIGS. 6, 8 and 13 graphically illustrate the exemplary processes of FIGS. 5, 7 and 12A and 12B respectively.

The exemplary process may begin with the retrieval of an advertisement-containing document 105 (act 505). As shown in FIG. 6, document 105 may include ads 110-1 through 110-N and other content 115. In one implementation, for example, the document may include a web page. Each advertisement in document 105 may have associated with it a destination URL that, if the ad is selected by a client, directs the client to a server that stores the full content of the ad. Ad(s) may then be extracted from the ad-containing document 105, including the destination URL associated with each ad (act 510). FIG. 6 illustrates the extraction of destination URLs 605-1 through 605-N from respective ads 110-1 through 110-N.

A document, that corresponds to each destination URL 605 and contains the content of a respective advertisement, may be retrieved (act 515). For example, the server that stores the full content of the ad may be accessed, using the destination URL, and the document retrieved. Concepts may then be extracted from each of the retrieved documents (act 520). The concepts may be extracted by, for example, analyzing the textual content of each retrieved document and associating selected text, or a group of text, with a given concept. FIG. 6 illustrates advertisements 610-1 through 610-N that have been retrieved using respective URLs 605-1 through 605-N. As shown in FIG. 6, concepts 620-1 through 620-N may be extracted from respective content 615-1 through 615-N of each of the ads 610-1 through 610-N. Subsequently, the extracted concepts may be labeled as useful to the audience of the ad-containing document (not shown—see act 410 above). In one implementation, the extracted concepts may be labeled as being relevant to the ad-containing document. As one example, if an ad for sport utility vehicles (SUVs) is included in a first document about hiking, then the concept "SUV" extracted from a second document accessed by a URL associated with the SUV ad may be labeled as being useful to the audience of the first document.

Exemplary Process

Figure 7:
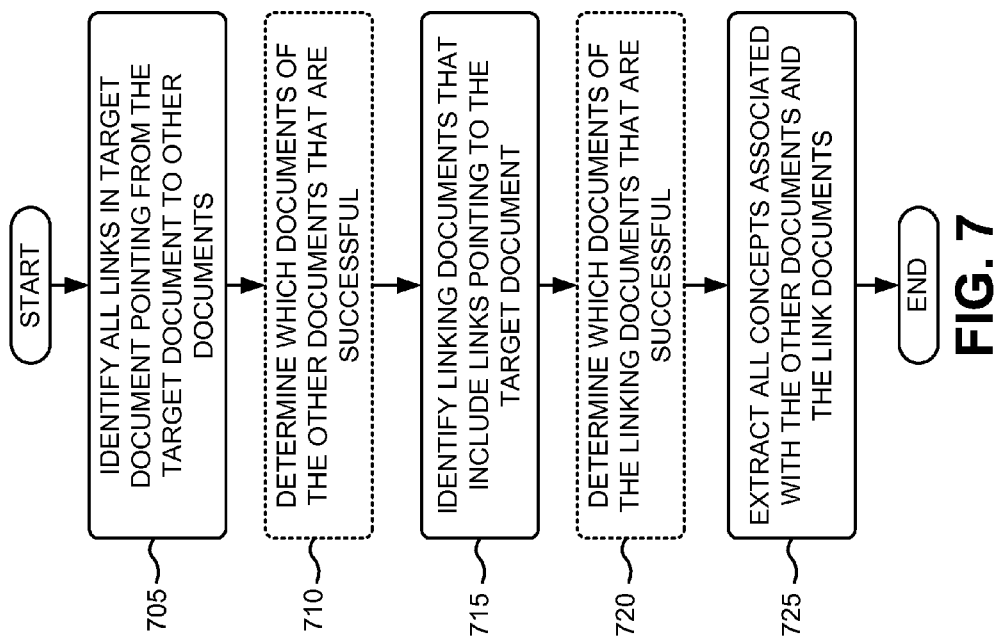

FIG. 7 is a flowchart of one exemplary process for inferring new or related concepts for a target document consistent with the principles of the invention. FIG. 7 provides further details of one exemplary process for implementing act 405 of FIG. 4.

Figure 8:
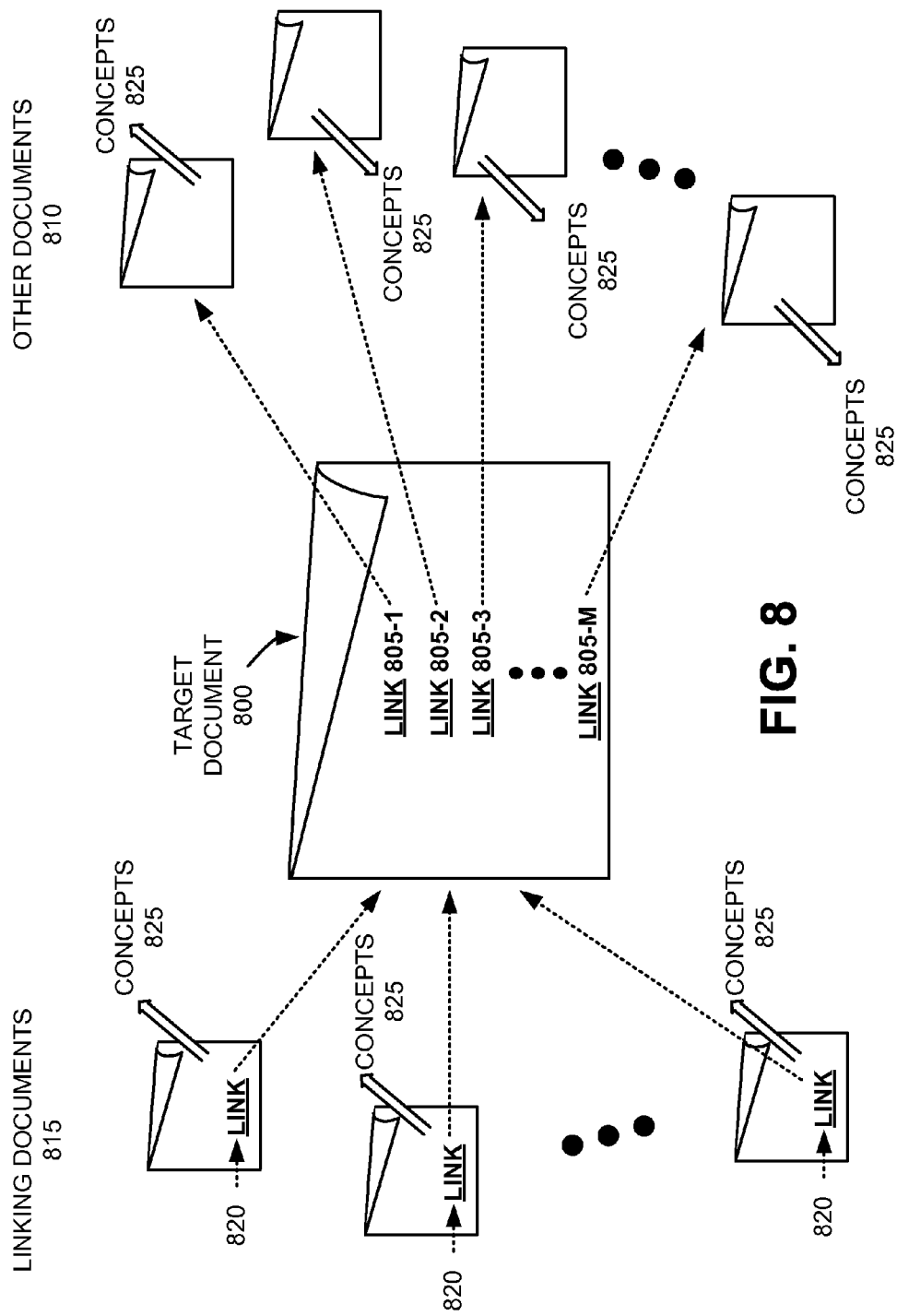

The exemplary process may begin with the identification of all links in a target document pointing from the target document to other documents (act 705). For example, the target document may include a web page with several links pointing to several other web pages. FIG. 8 illustrates a target document 800 with multiple identified links 805-1 through 805-M, each of which points to a document of other documents 810. Optionally, a determination may be made which documents of the other documents 810, pointed to by the identified links 805, are successful (act 710). The success of each of the other documents 810 may be determined in a number of different ways. In one implementation, for example, a number of times each other document 810 is accessed from target 800 document may indicate the "success" of the other document. For example, document A, that has been accessed x times from target document 800, may be more successful than document B, that has been accessed x−10 times from target document 800. The other documents 810 (i.e., documents pointed to by identified links in the target document) that are accessed the most from target document 800, thus, may be determined to be the most successful.

Linking documents, which include links pointing to target document 800, may be identified (act 715). For example, the linking documents may include web pages, with each web page including a link pointing to target document 800. FIG. 8 illustrates multiple linking documents 815 each of which includes a link 820 pointing to target document 800. Optionally, a determination may then be made which documents of the linking documents 815, that include links pointing to target document 800, are successful (act 720). The success of each of the linking documents 815 may be determined in a number of different ways. In one implementation, for example, a number of times each linking document 815 is used to access target document 800 may indicate the "success" of the linking document 815. For example, document A, that has been used to access target document 800 y times, may be more successful than document B, that has been used to access target document 800 y−15 times. The linking documents 815 (i.e., documents that include a link pointing to the target document) that are used to access target document 800 the most, thus, may be determined to be the most successful.

Concepts associated with the other documents and the linking documents may then be extracted (act 715). FIG. 8 illustrates concepts 825 extracted from each of the other documents 810 and linking documents 815. In one implementation, a "concept" may include portions, or all of, anchor text that surrounds a link in a document. Anchor text provides a description of the document to which the associated link is pointing. For example, a portion of the target document, or a link document, may include the following:

<a href=http://www.espn.com>World of Sports</a>

The link in this example is www.espn.com and the anchor text is "World of Sports." From this anchor text, it can be inferred that www.espn.com is associated with the concept "World of Sports." In another implementation, the textual content of each other document pointed to by the target document, and each linking document that points to the target document, may be analyzed, and selected text, or a group of text, may be associated with a given concept. In a further implementation, concepts may be extracted only from those documents pointed to by links in the target document, or linking documents that include links to the target document, that are determined to be successful, as described above with respect to acts 710 and 720.

Subsequently, the extracted concepts may be labeled as useful to the audience of the target document (not shown). For example, if a group of text in another document pointed to by the target document includes text specifying "NASCAR Racing in 2004," then this group of text may be labeled as a concept useful to the audience of the target document.

Exemplary Process

Figure 9:
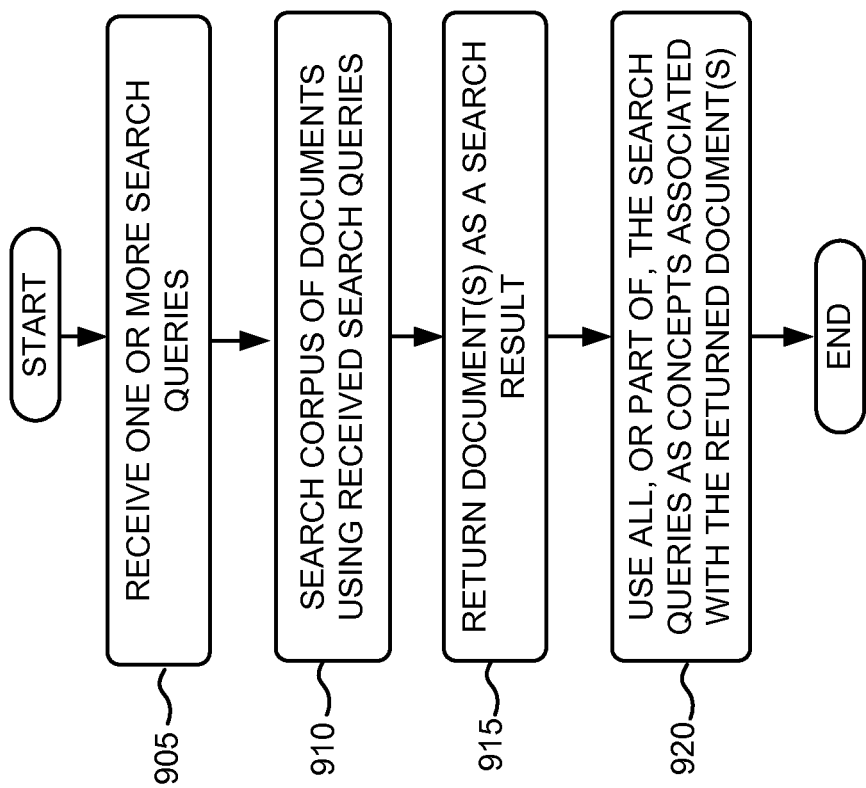

FIG. 9 is a flowchart of one exemplary process for inferring new or related concepts for a document from search queries used to retrieve the document from a corpus of documents consistent with the principles of the invention. FIG. 9 provides further details of one exemplary process for implementing act 405 of FIG. 4.

The exemplary process may begin with receipt of one or more search queries (act 905). In one implementation, server 220 with search engine 225 may receive search queries from a client 210, or multiple clients 210. A corpus of documents may then be searched using the received one or more search queries (act 910). Server 220 may search the corpus of documents, using the one or more search queries received from the client and using known document searching techniques. A document(s) may be returned to the client 210, or multiple clients 210, as a search result (act 915). Server 220, for example, may rank the results of the searching using known ranking techniques, and return multiple documents as search results. All, or part, of the search queries may be used as concepts associated with the returned document(s) (act 920). For example, search queries that include "wind surfing," "Florida," and "2004" may be used as concepts associated with a document(s) returned as a result of a search. As another example, search queries that include "MIT Sloan MBA Admissions" may return the MIT Sloan School web page as one of the results of an executed search. Thus, the concept "MBA Admissions" may be associated with the MIT Sloan school web page. Subsequently, the concepts may be labeled as useful to the audience of the returned document (not shown). Using the above example, the concept "MBA Admissions" may be labeled as useful to the audience of the MIT Sloan School web page.

Exemplary Process

Figure 10:
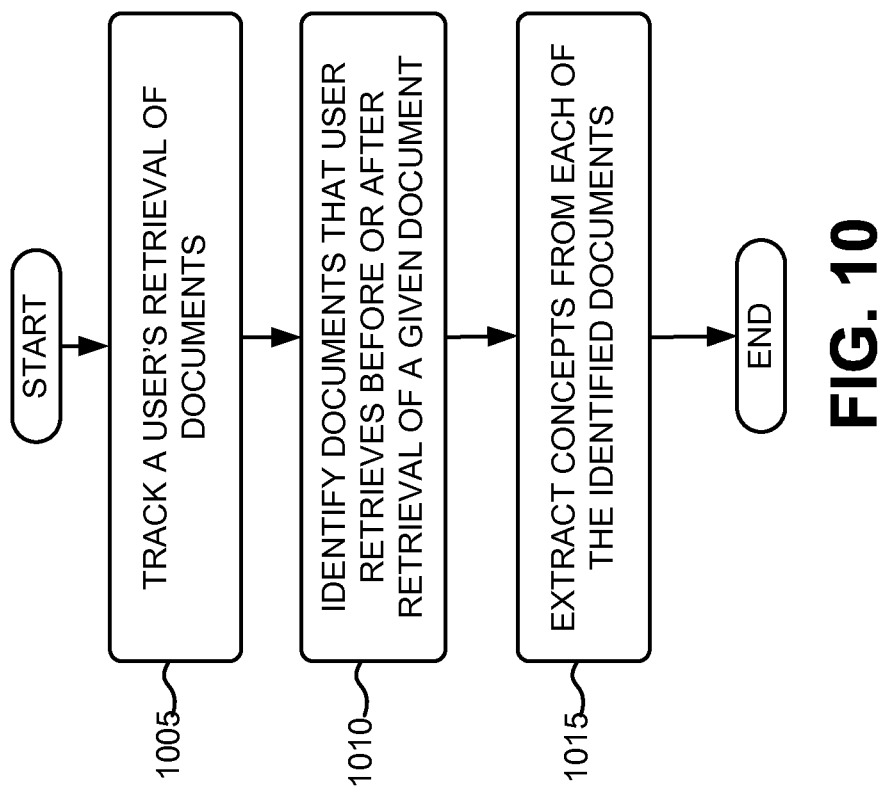

FIG. 10 is a flowchart of one exemplary process for indirectly inferring new or related concepts for a specific retrieved document consistent with the principles of the invention. FIG. 10 provides further details of one exemplary process for implementing act 405 of FIG. 4.

The exemplary process may begin with the tracking of a user's retrieval of documents (act 1005). In one implementation, Internet Service Provider (ISP) 230 may track a user's retrieval of documents from one or more servers (e.g., server 215) in network 235. In another implementation, a server (e.g., server 215 or server 220) that stores multiple documents may track a user's retrieval of certain documents from the stored documents. In a further implementation, a client 210 may track an associated user's retrieval of documents from one or more servers (e.g., server 215 or server 220) in network 235. Documents that the user retrieves before or after retrieval of a given document may be identified (act 1010). For example, if a user retrieves document C, then documents A and B, which the user retrieved before retrieval of document C, and documents D and E, which the user retrieved after retrieval of document C, may be identified. Concepts may be extracted from each of the identified documents (act 1015). The concepts may be extracted by, for example, analyzing the textual content of each retrieved document and associating selected text, or a group of text, with a given concept. Subsequently, the extracted concepts may be labeled as useful to the audience of the given document (not shown). As an example, if a perfume web page and a women's web page have a large number of users shared between them, it can be inferred that the concepts "perfume" and "fragrance" are useful to the audience of the women's web page, and the concept "woman", and other related concepts, is useful to the audience of the perfume web page.

Exemplary Process

Figure 11:
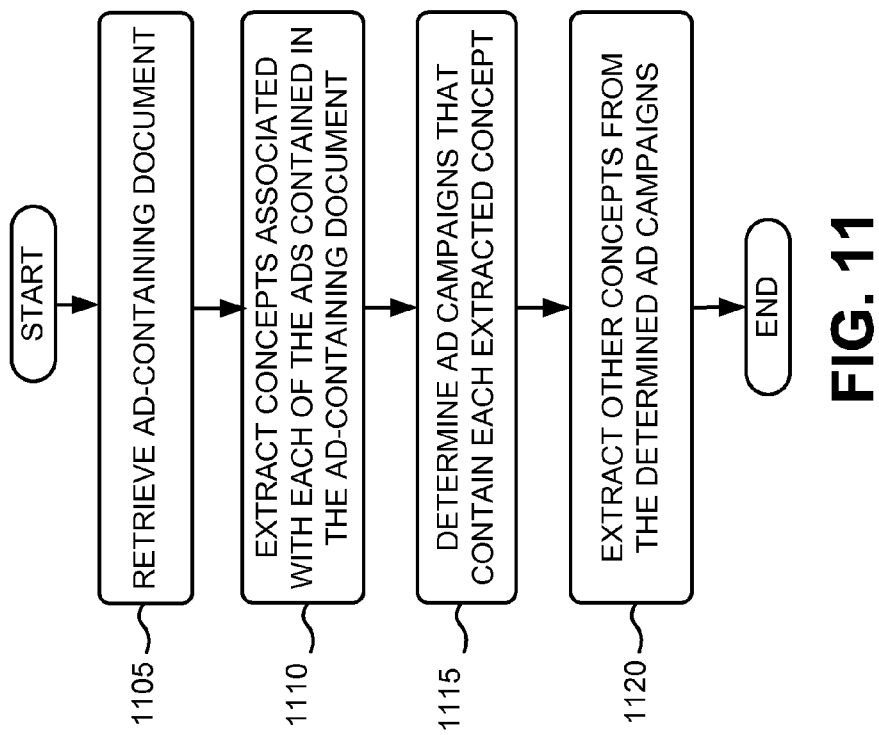

FIG. 11 is a flowchart of an exemplary process for indirectly inferring new or related concepts for an advertisement-containing document consistent with the principles of the invention. FIG. 11 provides further details of one exemplary process for implementing act 405 of FIG. 4.

The exemplary process may begin with the retrieval of an advertisement-containing document (act 1105). In one implementation, for example, the document may include a web page that includes one or more advertisements. Concepts associated with each of the advertisements contained in the ad-containing document may then be extracted (act 1110). One or more concepts may be associated with each advertisement prior to, or at the time of, inclusion of each advertisement in the ad-containing document. For example, an advertisement may have associated with it the concepts "memory chips" and "microprocessors." Ad campaigns that contain each extracted concept may be determined (act 1115). A server (e.g., server 215 or 220) may keep track of each ad campaign, of multiple ad campaigns, associated with advertisements included in documents served by the server. Each ad campaign may have associated with it one or more concepts. An advertiser associated with each ad campaign may inform the server of concepts that relate to, or are associated with, each of their ad campaigns. Other concepts from the determined ad campaigns may then be extracted (act 1120). Subsequently, the extracted concepts may be labeled as useful to the audience of the ad-containing document (not shown). For example, if an advertiser includes an ad about memory chips in a document about memory chips, and if the same advertiser has the concept "disk drive" associated with this campaign, then "disk drive" could be labeled as useful to the audience of the ad-containing document.

Exemplary Process

Figure 12B:
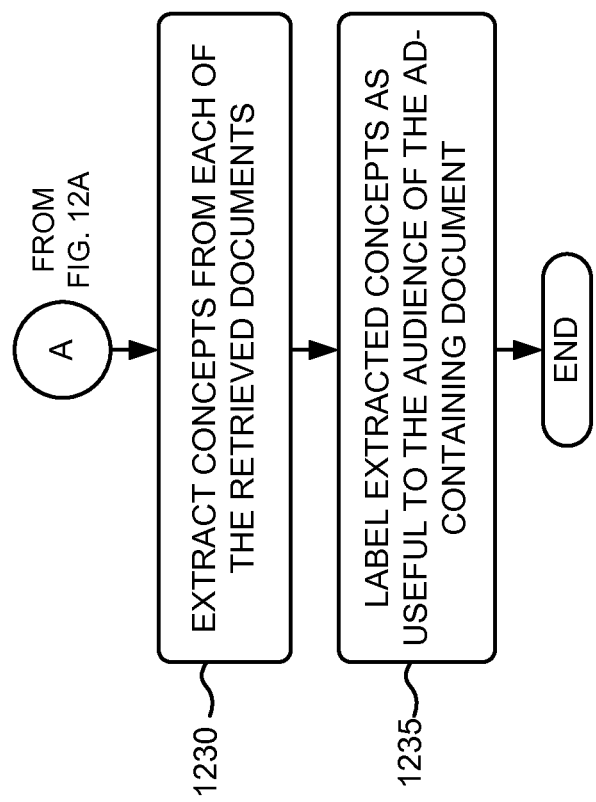

FIGS. 12A and 12B are interconnected flowcharts of another exemplary process for inferring new or related concepts for a document containing one or more advertisements consistent with the principles of the invention. FIGS. 12A and 12B provide further details of one exemplary process for implementing act 405 of FIG. 4.

Figure 13:
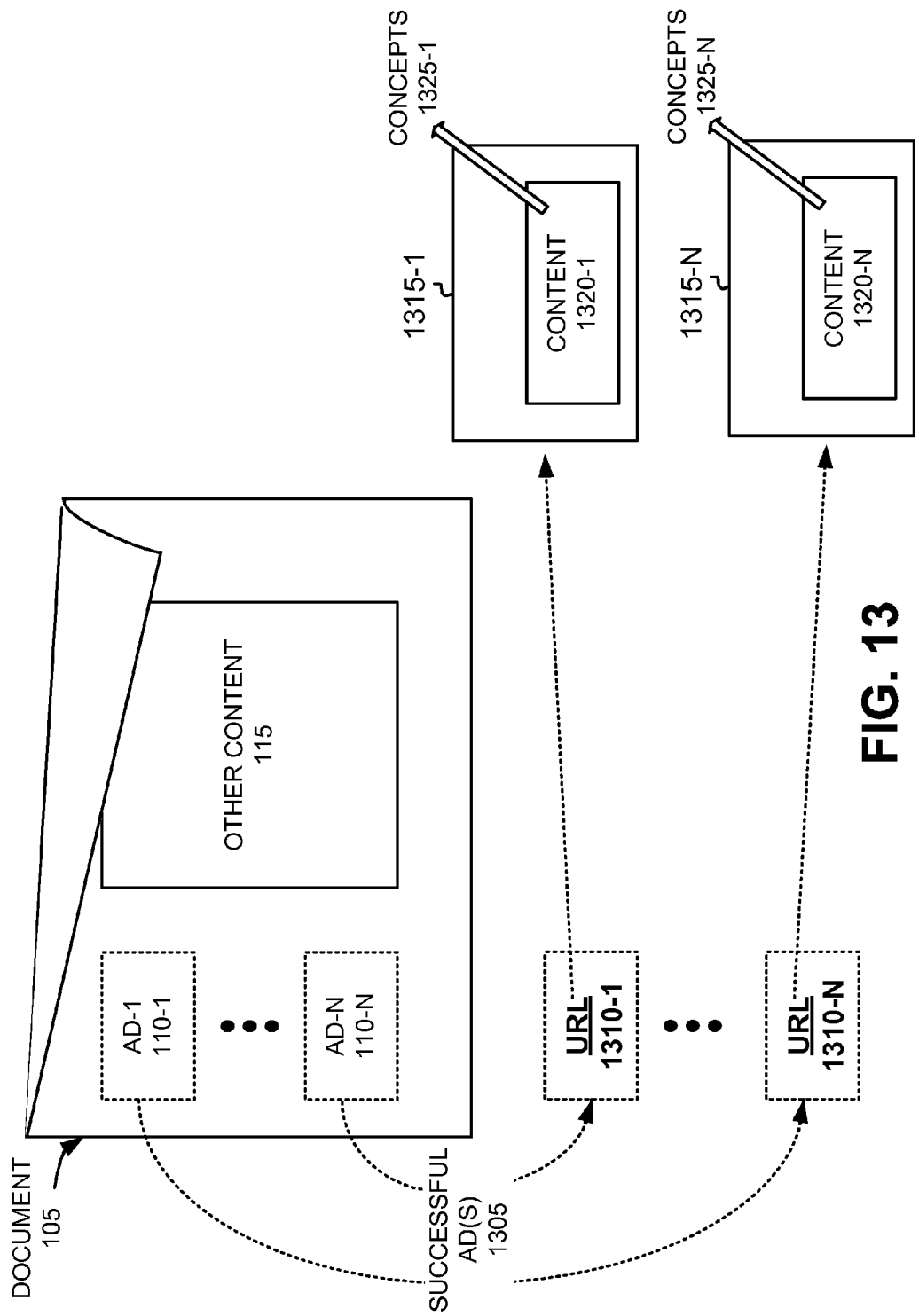

The exemplary process may begin with the retrieval of an advertisement-containing document 105 (act 1205)(FIG. 12A). As shown in FIG. 13, document 105 may include ads 110-1 through 110-N and other content 115. In one implementation, for example, the document may include a web page. Each advertisement in document 105 may have associated with it a destination URL that, if the ad is selected by a client, directs the client to a server that stores the full content of the ad.

A determination may be made which ads of the ad-containing document 105 are successful (act 1210). The success of each ad may be determined in a number of different ways. In one implementation, for example, a number of "hits" on each add may determine the success of each ad. Ads that receive the most "hits," and, thus, are the most popular, may be determined to be the most successful. In another implementation, an amount of revenue generated by each ad may determine the success of each ad. In another implementation, "mouse-over" may be monitored (i.e., monitoring mouse-induced movement of a cursor over ads of document 105) to track interest in an ad 110. The successful ads (e.g., successful ads 1305 of FIG. 13) may then be selected (act 1215). For example, three ads associated with a document that includes seven ads may have 100 or more "hits" and, thus, be selected as the most successful.

The selected successful ad(s) 1305 may then be extracted from the ad-containing document 105, including the destination URL associated with each ad (act 1220). FIG. 13 illustrates the extraction of destination URLs 1310-1 through 1310-N from respective ads 110-1 through 110-N. Each ad 110 of document 105 may include any type of ad whose content may be related, or completely unrelated, to the other content 115 of document 105. Thus, an advertiser may target any type of related or unrelated to document 105, and not just contextually relevant ads.

A document, that corresponds to each destination URL 1310 and contains the content of a respective advertisement, may be retrieved (act 1225). For example, the server that stores the full content of the ad may be accessed, using the destination URL, and the document retrieved. Concepts may then be extracted from each of the retrieved documents (act 1230)(FIG. 12B). The concepts may be extracted by, for example, analyzing the textual content of each retrieved document and associating selected text, or a group of text, with a given concept. FIG. 6 illustrates advertisements 1315-1 through 1315-N that have been retrieved using respective URLs 1310-1 through 1310-N. As shown in FIG. 13, concepts 1325-1 through 1325-N may be extracted from respective content 1320-1 through 1320-N of each of the ads 1315-1 through 1315-N. Subsequently, the extracted concepts may be labeled as useful to the audience of the ad-containing document (not shown—see act 410 above). In one implementation, the extracted concepts may be labeled as being relevant to the ad-containing document.

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 4, 5, 7 and 9-11, the order of the acts may be modified in other implementations consistent with the principles of the invention. Also, non-dependent acts may be performed in parallel.

As one skilled in the art will appreciate, the processes exemplified by FIGS. 4, 5, 7, 9-11, 12A and 12B may be, at least partially, implemented in software and stored on a computer-readable memory, such as main memory 330, ROM 340 or storage device 350 of server 215, server 220 or ISP 230, as appropriate. In other implementations, the processes exemplified by FIGS. 4, 5, 7, 9-11, 12A and 12B may be, at least partially, implemented in hardwired circuitry, such as combinational logic, within processing unit 320 of server 215, server 220, or ISP 230, as appropriate. In yet other implementations, the process exemplified by FIGS. 4, 5, 7, 9-11, 12A and 12B may be implemented manually with, possibly, only partial use of a processing device, such as a microprocessor.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein. Further, certain portions of the invention have been described as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by one or more server devices, the method comprising:
   receiving, by a processor of the one or more server devices, a first document;
   identifying, by a processor of the one or more server devices, a plurality of second documents that each include a link pointing to the first document;
   determining, by a processor of the one or more server devices, a second document of the plurality of second documents that has been used to access the first document more than any other second document of the plurality of second documents;
   extracting, by a processor of the one or more server devices, concepts associated with the determined second document; and
   associating, by a processor of the one or more server devices, the extracted concepts with the first document, at least one extracted concept, of the extracted concepts, being associated with anchor text in the determined second document.

2. The method of claim 1, further comprising:
   identifying links in the first document pointing from the first document to a plurality of third documents;
   determining which third document of the plurality of third documents has been accessed, using the first document, more than other third documents of the plurality of documents;
   extracting other concepts that are associated with the determined third document; and
   associating the extracted other concepts with the first document.

3. The method of claim 1, where at least one concept of the other concepts is associated with anchor text surrounding a link in the determined third document.

4. The method of claim 1, where at least one other extracted concept of the extracted concepts is associated with an advertisement of the determined second document.

5. The method of claim 1, further comprising:
   labeling the extracted concepts as relevant to the first document or useful to an audience of the first document.

6. A non-transitory computer-readable medium storing instructions, the instructions comprising:
   one or more instructions that, when executed by at least one processor, cause the at least one processor to:
      receive a first document;
      identify links in a plurality of second documents that each include a link to the first document;
      determine a second document of the plurality of second documents that has been used to access the first document more frequently than any other second document of the plurality of second documents;
      extract concepts associated with the determined second document; and
      associate the extracted concepts with the first document, at least one extracted concept, of the extracted concepts, being associated with anchor text in the determined second document.

7. The non-transitory computer-readable medium of claim 6, where at least one other extracted concept, of the extracted concepts, is associated with an advertisement of the determined second document.

8. The non-transitory computer-readable medium of claim 6, where the first document includes at least one of a web page, an e-mail, a file, a combination of files, one or more files with embedded links to other files, a news group posting, a blog, or a web advertisement.

9. The non-transitory computer-readable medium of claim 6, the instructions further comprising:
   one or more instructions that, when executed by at least one processor, cause the at least one processor to:
      identify links in the first document pointing from the first document to a plurality of third documents;
      determine a third document of the plurality of third documents that has been used to access the first document more frequently than any other third document of the plurality of third documents;
      extract other concepts associated with the determined third document; and
      associate the other concepts with the first document.

10. The non-transitory computer-readable medium of claim 9, where at least one concept of the other concepts is associated with anchor text surrounding a link in the determined third document.

11. A system comprising:
    a memory to store instructions; and
    a processor to execute the instructions to:
       receive a first document that includes a plurality of advertisements;
       identify one or more advertisements, of the plurality of advertisements, that have been selected more than any other advertisements of the plurality of advertisements;
       retrieve particular documents associated with the one or more advertisements;
       extract concepts from the retrieved particular documents,
          at least one extracted concept of the extracted concepts being associated with anchor text associated with a link in one of the retrieved particular documents; and
       associate the extracted concepts with the first document.

12. The system of claim 11, where, when extracting the concepts from the retrieved particular documents, the processor is to:
    analyze textual content of the retrieved particular documents, and
    associate the textual content with the at least one extracted concept.

13. The system of claim 11, where the processor is further to:
    label the extracted concepts as useful to an audience of the first document.

14. The system of claim 11, where the processor is further to:
label the extracted concepts as relevant to the first document.

15. The system of claim 11, where the first document includes at least one of a web page, an e-mail, a file, a combination of files, one or more files with embedded links to other files, a news group posting, a blog, or a web advertisement.

16. A method comprising:
identifying, by one or more processors and for a first document, a plurality of second documents that each include a link pointing to the first document;
determining, by one or more processors, a second document of the plurality of second documents that has been used to access the first document more than any other second document of the plurality of second documents;
extracting, by one or more processors, first concepts from the determined second document,
at least one extracted first concept, of the extracted first concepts, being associated with anchor text in the determined second document;
identifying, by one or more processors and for the first document, one or more advertisements included in the first document;
extracting, by one or more processors, second concepts from the identified one or more advertisements; and
associating, by one or more processors, the extracted first concepts and the extracted second concepts with the first document.

17. The method of claim 16, further comprising:
labeling one or more of the extracted first concepts as relevant to the first document or useful to an audience of the first document.

18. The method of claim 16, further comprising:
labeling one or more of the extracted second concepts as relevant to the first document or useful to an audience of the first document.

19. The method of claim 16, where identifying the one or more advertisements comprises:
identifying the one or more advertisements that have generated a revenue that is greater than a predetermined amount of revenue.

20. The method of claim 16, where identifying the one or more advertisements comprises:
identifying the one or more advertisements that have been selected more than any other advertisements that are included in the first document.

* * * * *